United States Patent
Abdella

(10) Patent No.: US 10,723,243 B2
(45) Date of Patent: Jul. 28, 2020

(54) SEAT ADJUSTER

(71) Applicant: Lear Corporation, Southfield, MI (US)

(72) Inventor: David J. Abdella, Royal Oak, MI (US)

(73) Assignee: Lear Corporation, Southfield, MI (US)

(*) Notice: Subject to any disclaimer, the term of this patent is extended or adjusted under 35 U.S.C. 154(b) by 14 days.

(21) Appl. No.: 16/197,958

(22) Filed: Nov. 21, 2018

(65) Prior Publication Data

US 2020/0156504 A1    May 21, 2020

(51) Int. Cl.
*B60N 2/02* (2006.01)
*B60N 2/10* (2006.01)

(52) U.S. Cl.
CPC ............ *B60N 2/0232* (2013.01); *B60N 2/10* (2013.01); *B60N 2002/0236* (2013.01)

(58) Field of Classification Search
CPC .......... B60N 2/02; B60N 2/0232; B60N 2/10; B60N 2002/0236
See application file for complete search history.

(56) References Cited

U.S. PATENT DOCUMENTS

| | | |
|---|---|---|
| 4,966,045 A | 10/1990 | Harney |
| 5,199,679 A | 4/1993 | Nakamura et al. |
| 6,361,109 B1 | 3/2002 | Tokarz et al. |
| 6,572,065 B2 | 6/2003 | Koga et al. |
| 6,843,460 B2 | 1/2005 | Koga et al. |
| 7,281,749 B2 | 10/2007 | Yamada et al. |
| 7,328,939 B2 | 2/2008 | Moriyama et al. |
| 7,614,693 B2 | 11/2009 | Ito |
| 8,128,147 B1 | 3/2012 | Kanda et al. |
| 8,177,280 B2 | 5/2012 | Yamada et al. |
| 8,585,148 B2 | 11/2013 | Yamada et al. |
| 8,590,971 B2 | 11/2013 | Ito et al. |
| 8,616,645 B2 | 12/2013 | Ito |
| 8,684,462 B2 | 4/2014 | Brewer et al. |
| 8,827,367 B2 | 9/2014 | Hibi |
| 8,888,181 B2 | 11/2014 | Perraut et al. |
| 8,936,526 B2 | 1/2015 | Boutouil et al. |
| 8,985,686 B2 | 3/2015 | Breitfeld et al. |
| 9,266,449 B2 | 2/2016 | Behrens |
| 9,511,687 B2 | 12/2016 | Seibold et al. |
| 10,195,975 B2* | 2/2019 | Becker .................. B60N 2/933 |
| 2010/0060061 A1 | 3/2010 | Koga et al. |
| 2012/0049597 A1 | 3/2012 | Brewer et al. |
| 2016/0059752 A1 | 3/2016 | Kishida et al. |
| 2017/0088018 A1 | 3/2017 | Suzuki |
| 2019/0152347 A1* | 5/2019 | Becker .................. F16H 57/032 |
| 2019/0255970 A1* | 8/2019 | Kuntz .................. B60N 2/0232 |

* cited by examiner

*Primary Examiner* — Philip F Gabler
(74) *Attorney, Agent, or Firm* — Fishman Stewart PLLC

(57) ABSTRACT

A seat adjuster includes a first fastener, a second fastener, a third fastener, and/or a motor assembly. The motor assembly may include a motor, a first mounting portion, a second mounting portion, and/or a third mounting portion. The seat adjuster may include a pinion, a sector, and/or a side member. The first fastener, the second fastener, and/or the third fastener may connect the motor assembly to the side member. The first fastener may be connected to the side member and/or the first mounting portion via a torque prevailing connection. The third fastener may extend through and/or may restrict movement of the sector. The pinion may be engaged with the sector substantially without play. The side member may include a first aperture, a second aperture, and/or a third aperture.

7 Claims, 5 Drawing Sheets

SEAT ADJUSTER

TECHNICAL FIELD

The present disclosure generally relates to a seat adjuster including seat adjusters that may be used in connection with vehicles.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some seat adjusters may be relatively complex and/or may not provide sufficient functionality. Some seat adjusters may include play between components that may impair functionality and/or that may reduce apparent quality.

There is a desire for solutions/options that minimize or eliminate one or more challenges or shortcomings of seat adjusters. The foregoing discussion is intended only to illustrate examples of the present field and should not be taken as a disavowal of scope.

SUMMARY

In embodiments, a seat adjuster may include a first fastener, a second fastener, a third fastener, and/or a motor assembly. The motor assembly may include a motor, a first mounting portion, a second mounting portion, and/or a third mounting portion. The seat adjuster may include a pinion, a sector, and/or a side member. The first fastener, the second fastener, and/or the third fastener may connect the motor assembly to the side member. The first fastener may be connected to the side member and/or the first mounting portion via a torque prevailing connection. The third fastener may extend through and/or may restrict movement of the sector. The pinion may be engaged with the sector substantially without play. The side member may include a first aperture, a second aperture, and/or a third aperture. The second aperture and/or the third aperture may be elongated. The second fastener may be connected to the second mounting portion via the second aperture. The third fastener may be connected to the third mounting portion via the third aperture. The second aperture and/or the third aperture may be elongated in a direction of motor assembly rotation.

With embodiments, shapes of the second aperture and/or the third aperture may correspond to a difference between a first position of the pinion and/or a second position of the pinion. The motor assembly may include a first position and/or a second position. When the motor assembly is in the first position, the pinion may not be fully engaged with the sector. When the motor assembly is in the second position, the pinion may be fully engaged with the sector (e.g., substantially without play). The sector may be connected to a seat portion. The pinion may be engaged with the sector such that rotation of the pinion may cause the seat portion to tilt. An inner surface of the first mounting portion may be threaded. The third fastener may extend through and/or may restrict movement of the sector.

In embodiments, the first fastener may be a first bolt that may be engaged with the first mounting portion to connect the motor assembly to the side member. The pinion, the second mounting portion, and/or the third mounting portion may be disposed within 90 degrees of each other relative to the first mounting portion. The first mounting portion, the second mounting portion, and/or the third mounting portion may be offset from each other in an X-direction and/or a Y-direction.

With embodiments, a method of assembling a seat adjuster may include providing a first fastener, a second fastener, a third fastener, a motor, a pinion, a sector, and/or a side member. The method may include connecting the motor to the side member by connecting the first fastener to the side member, connecting the second fastener to the side member, and/or connecting the third fastener to the side member wherein the first fastener may be configured for a torque-prevailing connection with a first mounting portion of the motor. A first rotational axis may be aligned with the pinion, the sector may rotate about a second rotational axis, and/or a third rotational axis may be aligned with the first mounting portion. Connecting the first fastener to the side member may include (i) rotating the pinion about the third rotational axis into complete engagement with the sector and (ii) retaining, via the first fastener, the pinion in complete engagement with the sector.

In embodiments, the side member may include a first aperture, a second aperture, and/or a third aperture. The first aperture may be configured for connection with the first mounting portion and/or the first fastener substantially without play. The second aperture and/or the third aperture may include curved configurations that may correspond to rotational movement of the pinion about the third rotational axis. Connecting the first fastener to the side member may involve a running torque of about 10 Nm. Connecting the first fastener to the side member may result in a final torque of about 30 Nm. Connecting the second fastener and/or the third fastener with the side member may be completed while the pinion is retained in complete engagement with the sector via the first fastener. The first fastener may include at least one of external threads and/or internal threads. The method may include operating the motor to rotate the pinion and/or the sector to cause tilting of a seat portion, substantially without play between the pinion and the sector.

The foregoing and other aspects, features, details, utilities, and/or advantages of embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

Figure 1:
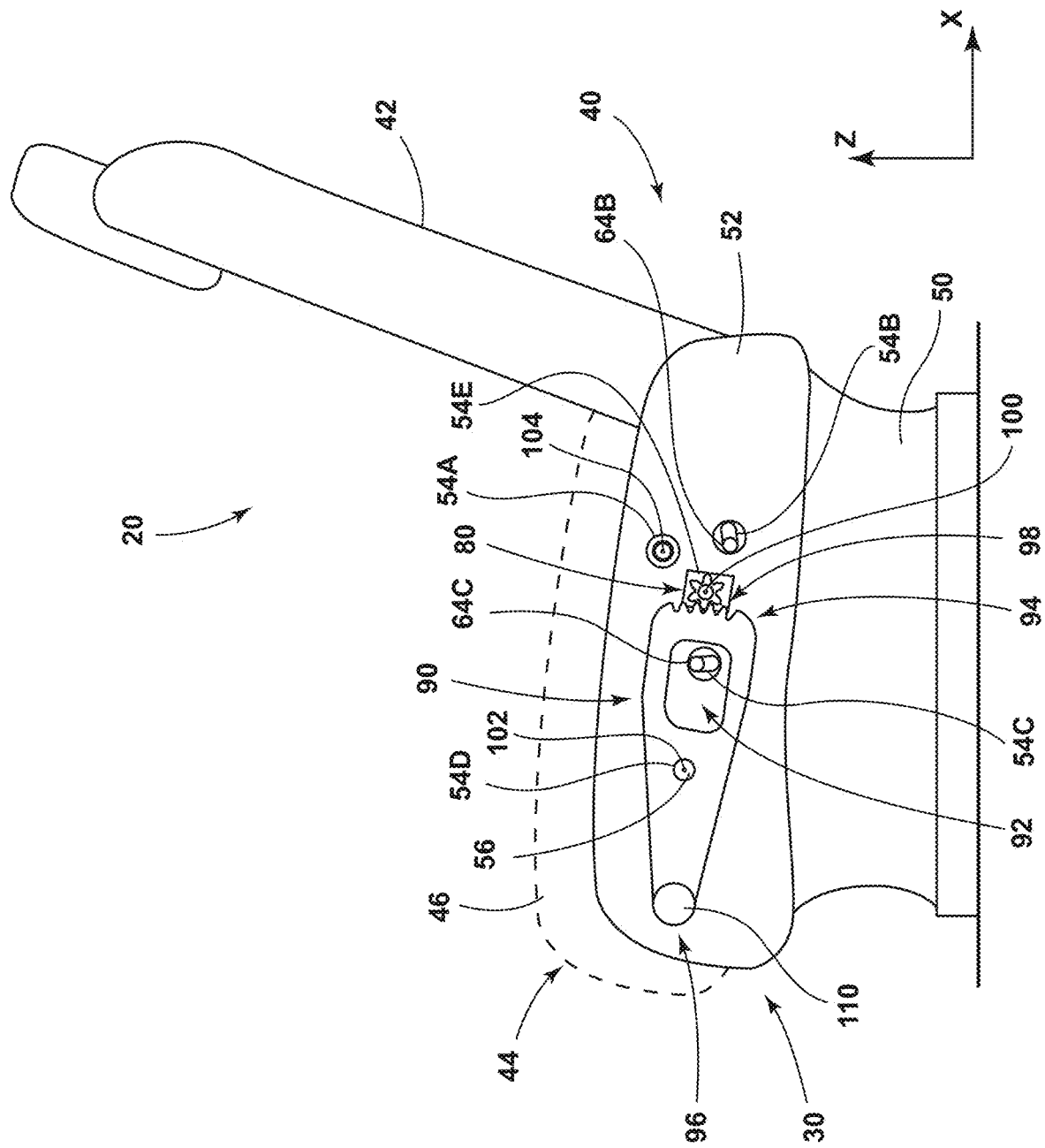
FIG. 1 is a side view generally illustrating an embodiment of a seat adjuster according to teachings of the present disclosure.

In embodiments, such as generally illustrated in FIG. 1, a seat assembly 20 may include a seat adjuster 30 and a seat 40. The seat 40 may include one or more portions, such as a seat back 42 and/or a seat base 44. One or both of the seat base 44 and/or seat back 42 may include a seat cushion 46. The seat 40 may include a frame 50, and the frame 50 may include a side member 52. The seat adjuster 30 may be configured to move a portion of the seat 40 (e.g., a seat cushion 46) relative to the side member 52. For example and without limitation, the seat adjuster 30 may adjust (e.g., move and/or tilt) the position of the seat cushion 46 of the seat base 44 (see, e.g., FIGS. 1 and 3). While the seat adjuster 30 may be illustrated in connection with moving/tilting a seat cushion 46 of the seat base 44, a seat adjuster 30 may be utilized to move/tilt a seat back 42 and/or a cushion thereof. The seat adjuster 30 may include a motor assembly 60 that may include a motor 62, a motor mount 64, a drive shaft 70, and/or a pinion 80 (see, e.g., FIGS. 2A and 2B). The pinion 80 may be configured for connection with a sector 90 that may be rotatably connected to the side member 52, such as via a pivot portion 56.

Figures 2A, 2B:
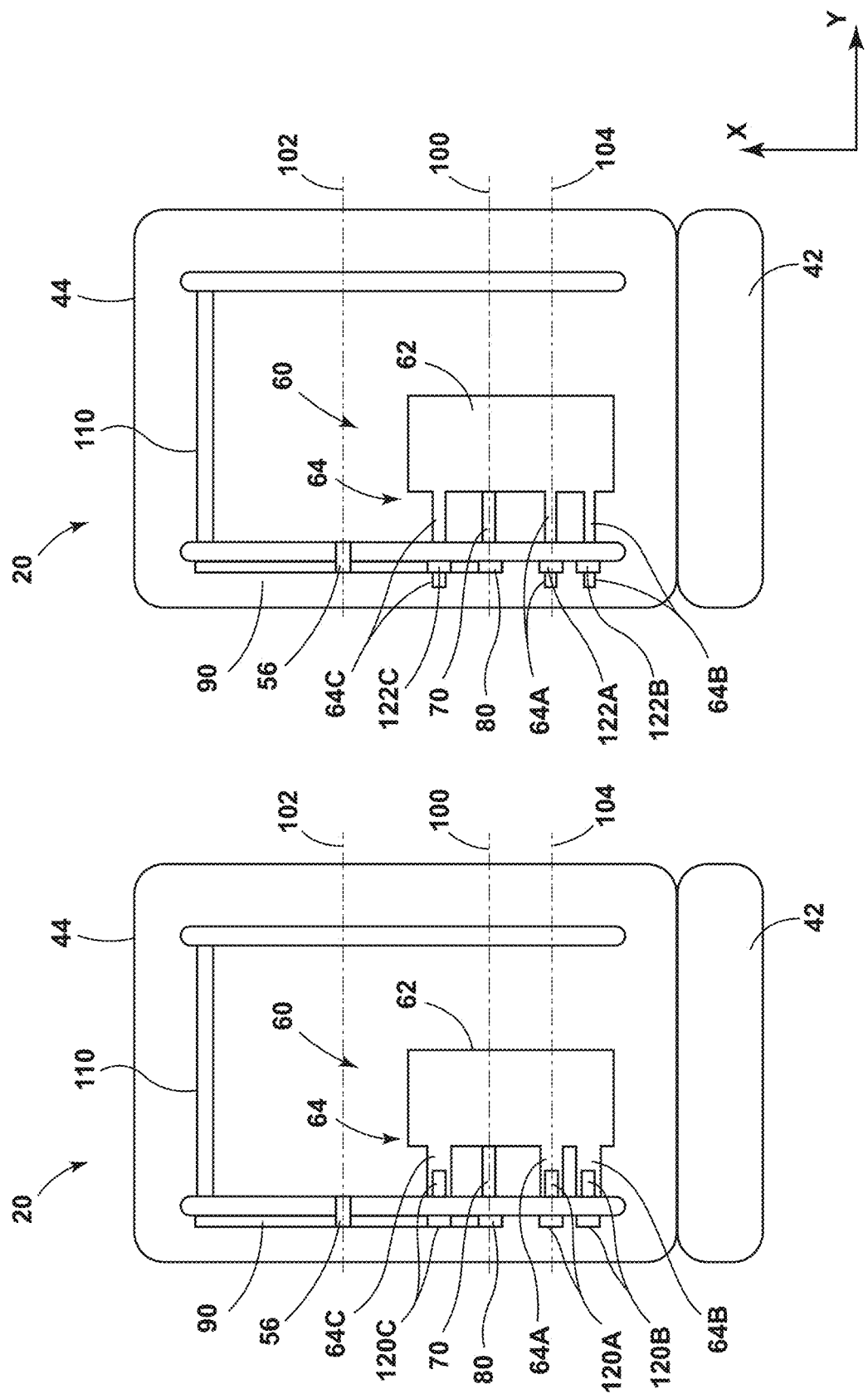
FIGS. 2A and 2B are top cross-sectional views generally illustrating portions of embodiments of seat adjusters according to teachings of the present disclosure.
Figure 3:
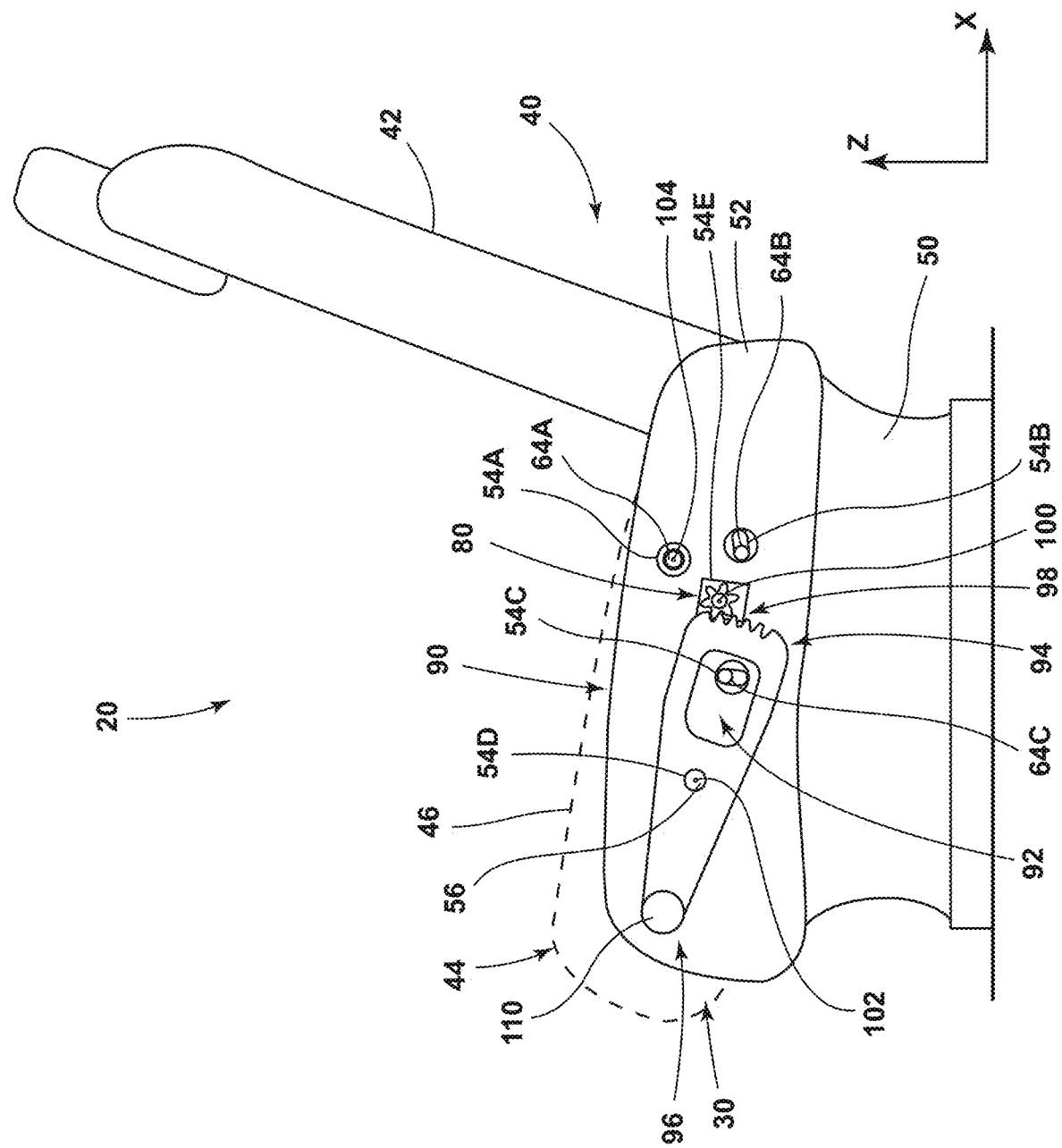
FIG. 3 is a side view generally illustrating portions of an embodiment of a seat adjuster according to teachings of the present disclosure.

With embodiments, such as generally illustrated in FIGS. 2A and 2B, a motor assembly 60 may include a motor 62 that may be at disposed at least partially within the seat 40. For example, the motor 62 may be disposed at least partially in and/or below the seat base 44 and/or the seat back 42. The motor 62 may be disposed at or about an inner surface of the side member 52. The motor 62 may be connected to the side member 52. The motor 62 may include portions that are fixed to the side member 52 and portions that rotate with respect to the side member 52. The motor 62 may be connected to a drive shaft 70, and/or the drive shaft 70 may be connected to the pinion 80. The motor 62 may drive (e.g., rotate) the drive shaft to rotate the pinion 80 about a first rotational axis 100, such as in a clockwise direction and/or a counter-clockwise direction. Rotation of the pinion 80 about the first rotational axis 100 may cause the sector 90 to rotate about a second rotational axis 102, which may cause the seat cushion 46 to move/tilt, such as relative to the side member 52. The first rotational axis 100 may be offset from the second rotational axis 102, such as in an X-direction and/or in a Z-direction (e.g., the second rotational axis 102 may be disposed in front of the first rotational axis in the X-direction).

Figure 4A:
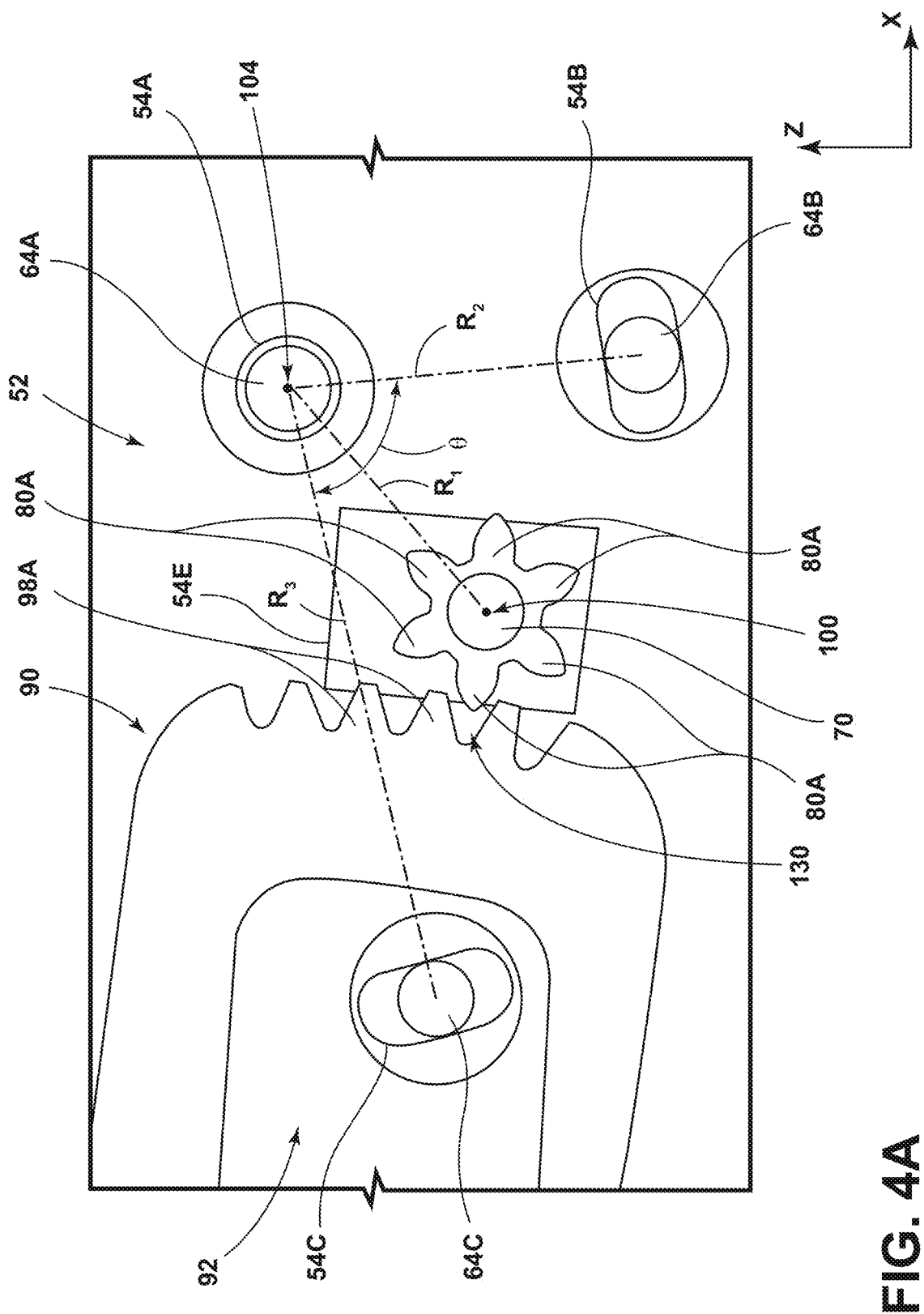
FIGS. 4A and 4B are side views generally illustrating portions of embodiments of a seat adjuster according to teachings of the present disclosure.
Figure 4B:
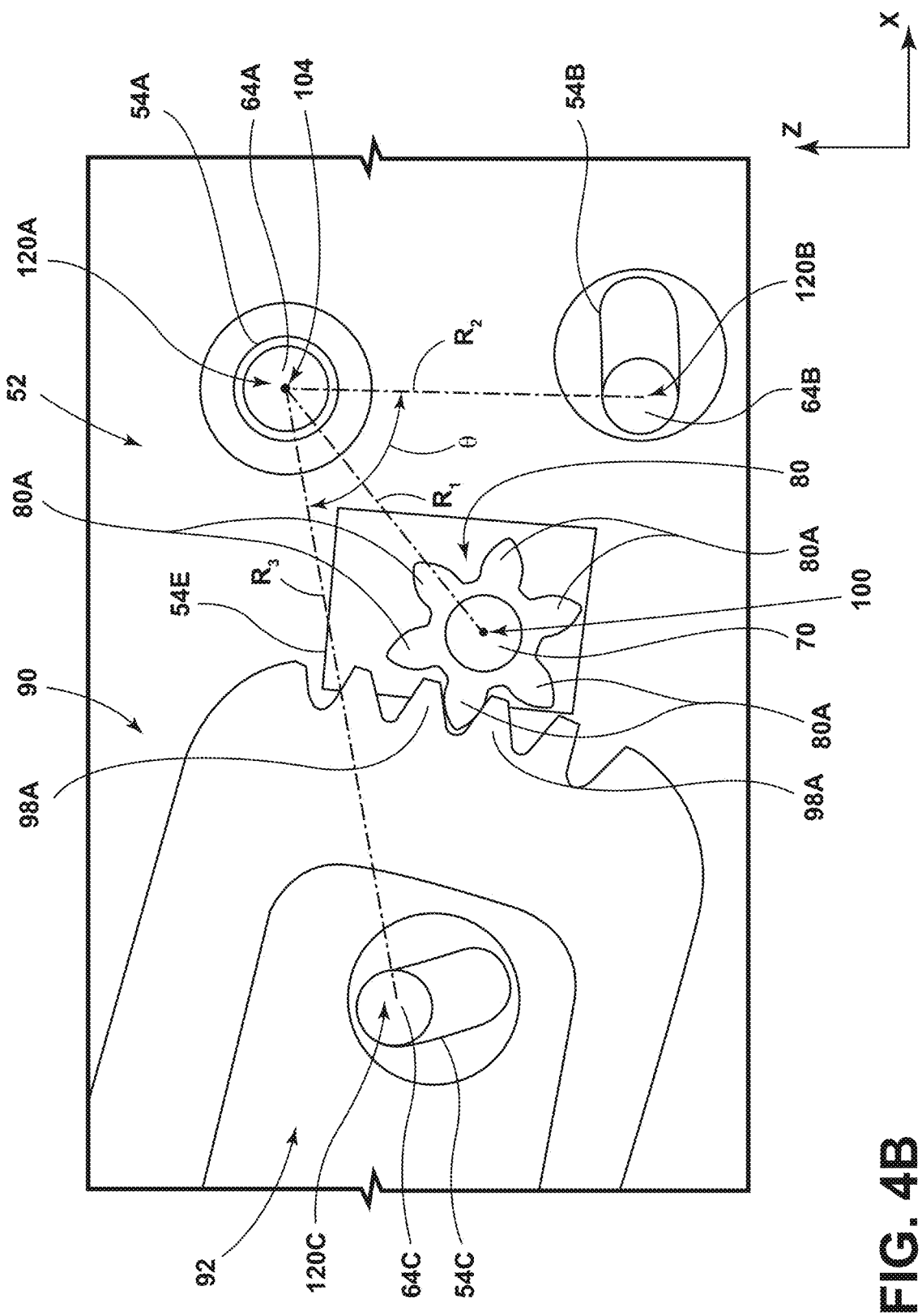

In embodiments, a sector 90 may be connected to a seat base 44 and/or a seat back 42. The sector 90 may include one or more of a variety of shapes, sizes, and/or configurations. For example, the sector 90 may be substantially triangular and/or elongated. Such as generally illustrated in FIG. 1, the sector 90 may be generally planar and may be substantially parallel to the side member 52. The sector 90 may include a sector aperture 92. The sector aperture 92 may be disposed at or about a middle, a first/rear end 94, and/or a second/front end 96 of the sector 90. The first end 94 of the sector may be opposite the second end 96. The sector aperture 92 may be disposed between the second rotational axis 102 and a first end 94 of the sector. The sector 90 may include an engagement portion 98. The engagement portion 98 may be disposed at or about the first end 94 of the sector 90. Such as generally illustrated in FIGS. 4A and 4B, the engagement portion 98 may include one or more teeth 98A that may be configured to engage the pinion 80. The teeth 98A may include one or more of a variety of shapes of shapes, sizes, and/or configurations. For example and without limitation, the teeth 98A may be generally triangular and/or rounded. The teeth 98A may be disposed linearly and/or in a curved orientation at the first end 94 of the sector 90. The second end 96 of the sector 90 may be connected to the seat cushion 46. The second end 96 may be connected to the seat cushion 46 via a crossmember 110 that may be connected to the sector 90. The crossmember 110 may be disposed at or about a front of the seat base 44 (or at an end of the seat back 42). The sector 90 may be configured to move (e.g., tilt) the seat cushion 46 via the crossmember 110 as the sector 90 rotates about the second rotational axis 102.

With embodiments, such as generally illustrated in FIGS. 1, 2A, and 2B, a pinion 80 may be connected to a drive shaft 70, a sector 90, and/or a side member 52. The pinion 80 may include one or more of a variety of shapes, sizes, and/or configurations. For example and without limitation, the pinion 80 may be substantially circular and/or rounded. The pinion 80 may include one or more teeth 80A disposed about a periphery of the pinion 80. The teeth 80A may include one or more of a variety of shapes, sizes, and/or configurations. For example and without limitation, the teeth 80A may be generally triangular and/or rounded. The shape of the teeth 80A of the pinion 80 may correspond to the shape of the teeth 98A of the sector 90. The teeth 80A of the pinion 80 may be configured to at least partially engage the teeth 98A on the engagement portion 98 of the sector 90. For example and without limitation, as the pinion 80 rotates, the teeth 80A of the pinion 80 may engage the teeth 98A of the sector 90, which may cause the sector 90 to rotate in an opposite direction than the pinion 80. If the pinion 80 rotates in a first direction (e.g., clockwise direction), the sector 90 may rotate in a second direction (e.g., a counter-clockwise direction), which may cause the seat cushion 46 to tilt upwards. If the pinion 80 rotates in the second direction, the sector 90 may rotate in the first direction, which may cause the seat cushion 46 to tilt downwards.

In embodiments, a side member 52 may be configured to provide support for the seat adjuster 30 and/or the seat 40. The side member 52 may include one or more apertures 54A, 54B, 54C (see, e.g., FIG. 4A) that may be configured to support the motor 62, the pinion 80, the sector 90, and/or the drive shaft 70. The one or more apertures 54A, 54B, 54C may include a first aperture 54A, a second aperture 54B, a third aperture 54C, and/or a fourth aperture 54D (see, e.g., FIG. 1). The motor 62 may include a motor mount 64, and/or the motor mount 64 may be connected to the side member 52 via the first aperture 54A, the second aperture 54B, third aperture 54C, and/or the fourth aperture 54D. The first aperture 54A, the second aperture 54B, and/or the third aperture 54C may be configured to connect the motor mount 64 to the side member 52. The first aperture 54A, the second aperture 54B, and/or the third aperture 54C may generally be disposed in a triangular orientation (see, e.g., FIGS. 1, 3, 4A, and 4B). For example and without limitation, the second aperture 54B may be disposed within an angle θ that may be about 90 degrees (e.g., about 80 degrees) of the third aperture 54C relative to the first aperture 54A. The pinion 80 may be disposed within the angle θ. The second aperture 54B and/or the third aperture 54C may be offset in the X-direction and/or Z-direction from the first aperture 54A. In some configurations, the second aperture 54B and/or the third aperture 54C may be disposed below the first aperture 54A in the Z-direction. In some other configurations, the second aperture 54B and/or the third aperture 54C may be disposed above the first aperture 54A in the Z-direction, such as with a mirrored or symmetrically opposite configuration. The first aperture 54A may be disposed at least partially between the second aperture 54B and the third aperture 54C with respect to the X-direction. The fourth aperture 54D may at least partially receive the drive shaft 70 and/or the pinion 80. The side member 52 may include a pivot portion 56 that may be configured to facilitate rotation of the sector 90 and/or may provide the second rotational axis 102. The sector 90 may rotate about the pivot portion 56 as the pinion 80 rotates. The side member 52 may include a fifth aperture 54E. The drive shaft 70 and/or the pinion 80 may be disposed at least partially in the fifth aperture 54E. The fifth aperture 54E may include a similar shape as the second aperture 54B/the third aperture 54C (e.g., may be curved) and/or the fifth aperture may be oversized, such as to compensate for tolerances or clearances.

With embodiments, the motor mount 64 may include a first mounting portion 64A, a second mounting portion 64B, and/or a third mounting portion 64C (see, e.g., FIGS. 2A, 2B, 4A, and 4B). The first mounting portion 64A may be connected to the side member 52 via the first aperture 54A, the second mounting portion 64B may be connected to the side member 52 via the second aperture 54B, and/or the third mounting portion 64C may be connected to the side member 52 via the third aperture 54C.

With embodiments, the connection between the motor mount 64 and the side member 52 may be via a torque prevailing configuration. A torque prevailing configuration/connection may include one or more of a variety of torque producing connections. For example and without limitation, torque prevailing configurations may include the use of a lock nut, threaded fasteners (e.g., torque prevailing fasteners), threaded engagement surfaces, and/or thread cutting/forming. Thread cutting/forming may include modifying and/or creating threads of a mounting portion and/or a fastener, such as a bolt, a nut, and/or washer including thread patterns that may be offset, at least to some degree. Thread cutting/forming may include one of a mounting portion and a fastener initially lacking threads and utilizing the other of the mounting portion and the fastener to form threads (e.g., at an inner surface).

In embodiments, the first mounting portion 64A, the second mounting portion 64B, and/or the third mounting portion 64C may be configured for connection with one or more fasteners (e.g., bolts, screws, nuts, etc.) to connect the motor mount 64 to the side member 52. The first mounting portion 64A may at least partially receive a first fastener 120A, the second mounting portion 64B may at least partially receive a second fastener 120B, and/or the third mounting portion 64C may at least partially receive a third fastener 120C. The mounting portions 64A, 64B, 64C, may or may not extend into the apertures 54A, 54B, 54C of the side member 52, and/or the ends of the mounting portions 64A, 64B, 64C, may be flush with the side member 52 (see, e.g., FIG. 2A). The outer surfaces of the fasteners 120A, 120B, 120C and the inner surfaces of the mounting portions 64A, 64B, 64C, may be threaded.

With embodiments, the first mounting portion 64A, the second mounting portion 64B, and/or the third mounting portion 64C may extend at least partially into the first aperture 54A, the second aperture 54B, and/or the third aperture 54C (see, e.g., FIG. 2B). The mounting portions 64A, 64B, 64C, may be configured as threaded shafts, such as to at least partially extend through the apertures 54A, 54B, 54C and/or be fastened to the side member 52 via a plurality of fasteners 122A, 122B, 122C (e.g., nuts and/or washers). The outer surfaces of the mounting portions 64A, 64B, 64C, may be threaded and the inner surfaces of the fasteners 122A, 122B, 122C may be threaded. The mounting portions 64A, 64B, 64C may at least partially be disposed into the respective apertures 54A, 54B, 54C.

In embodiments, the motor mount 64 may include a combination of mounting portions 64A, 64B, 64C, that may engage the apertures 54A, 54B, 54C of the side member 52 (e.g., mounting portions with external threads) and/or the motor mount 64 may include mounting portions 64A, 64B, 64C, that may not engage the apertures 54A, 54B, 54C of the side member 52 (e.g., mounting portions with internal threads). A mounting portion 64A, 64B, 64C, may, for example and without limitation, include internal threads and/or external threads.

In embodiments, the third mounting portion 64C and/or the third fastener 120C may extend into/through the sector aperture 92 and may restrict movement of the sector 90 relative to the side member 52 (e.g., may provide a physical stop for maximum rotation of the sector 90 in one or both rotational directions).

With embodiments, some or all of the first mounting portion 64A, the second mounting portion 64B, and the third mounting portion 64C may be connected to the side member 52 in a torque prevailing configuration (e.g., with fasteners 120A, 120B, 120C, 122A, 122B, and/or 122C). The torque prevailing connection between the first mounting portion 64A and the side member 52 may facilitate a proper connection/engagement between the pinion 80 and the sector 90.

In embodiments, the pinion 80 may include a first position relative to the sector 90 (see, e.g., FIG. 4A) and/or a second position (see, e.g., FIG. 4B) relative to the sector 90. The first position and the second position may, for example and without limitation, be less than 5 degrees apart (e.g., about 2 degrees apart). As the first mounting portion 64A is connected to the side member 52 (e.g., via the first fastener 120A), the pinion 80 may move between the first position and the second position. For example and without limitation, the pinion 80 and/or the motor assembly 60 may rotate about a third rotational axis 104 (see, e.g., FIGS. 3, 4A, and/or 4B) that may be aligned with the first mounting portion 64A, the first aperture 54A, and/or the first fastener 120A/122A. The drive shaft 70 and/or the pinion 80 may rotate about the first rotational axis 100 that may be aligned with the drive shaft 70 and/or the pinion 80, such as when actuated by the motor 62. The first rotational axis 100 and the third rotational axis 104 may be offset from each other, such a distance or radius $R_1$ (see, e.g., FIG. 4A). The first rotational axis 100 may move (e.g., rotate) with the motor mount 64, such as with the pinion 80 as the pinion 80 moves from the first position to the second position (see, e.g., FIG. 4B) as the first fastener 120A/122A is driven. The second rotational axis 102 and/or the third rotational axis 104 may remain substantially fixed relative to the side member 52.

When the pinion 80 is in the first position, the pinion 80 may not be engaged and/or may be partially engaged with the sector 90. For example and without limitation, when the pinion 80 is in the first position, the pinion teeth 80A may contact portions of the sector teeth 98A and/or a gap 130 may be disposed between the pinion teeth 80A and the sector teeth 98A (e.g., there may be play between the sector teeth 98A and the pinion teeth 80A). When the pinion 80 is in the second position, the pinion 80 may be completely and/or fully engaged with the sector 90. For example and without limitation, when the pinion 80 is in the second position, the pinion teeth 80A may contact the sector teeth 98A, and/or there may be no gaps between the contacting teeth (e.g., the pinion teeth 80A may be engaged with the sector teeth 98A substantially without play). Connecting the first mounting portion 64A with the side member 52 may include rotating the pinion 80 about the third rotational axis 104 from the first position to the second position. Such a connection may involve at least enough force/torque to overcome the force of rotational friction, gravity, and/or minor disturbances, such as to move the sector 90 into a position that may minimize or eliminate the gap 130 between the pinion teeth 80A and the sector teeth 98A. The final torque of the first fastener 120A/122A may generate a resulting axial force (e.g., a clamp load) between the first fastener 120A and the side member 52 sufficient to restrict or prevent the pinion 80 from moving out of the second (e.g., fully engaged) position, such as while the second fastener 120B/122B and/or the third fastener 120C/122C is connected with a respective mounting portion 64B, 64C and the side member 52 (e.g., the torque prevailing connection may retain the position of the pinion 80 relative to the sector 90).

With embodiments, such as generally illustrated in FIGS. 4A and 4B, a second aperture 54B and/or a third aperture 54C may include one or more of a variety of shapes, sizes, and/or configurations. For example, the second aperture 54B and/or third aperture 54C may be generally circular, curved, elongated, and/or oval-shaped. The second aperture 54B and/or the third aperture 54C may be configured to compensate for movement of the pinion 80 from the first position to the second position. The second aperture 54B and/or the third aperture 54C may include an elongated shape that may be elongated in the direction of a rotational path of the second mounting portion 64B and/or third mounting portion 64C. For example and without limitation, the shape (e.g., a length in an X-Z plane) of the second aperture 54B and/or the third aperture 54C may correspond to a difference (e.g., a change in the X, Z position of the pinion) between the first position and the second position of the pinion 80.

At least one dimension of the second aperture 54B may be larger than the diameter of the second mounting portion 64B and/or the second fastener 120B. At least one dimension of the third aperture 54C may be larger than the diameter of the third fastener 120C and/or the third mounting portion 64C. The first aperture 54A may be substantially the same size as the first mounting portion 64A or the first fastener 120A.

In embodiments, as the pinion 80 moves from the first position to the second position, the second mounting portion 64B and/or second fastener 120B may move within and/or along the second aperture 54B (e.g., may move in a similar manner as the pinion 80). For example and without limitation, the second mounting portion 64B may move about an arc with a radius $R_2$ (relative to the third rotational axis 104) as the pinion 80 moves about an arc with a radius $R_1$ ($R_2$ may be greater than $R_1$). As the pinion 80 moves from the first position to the second position, the third mounting portion 64C and/or the third fastener 120C may move within the third aperture 54C (e.g., may move in a similar manner as the pinion 80). For example and without limitation, the third mounting portion 64C may move about an arc with a radius $R_3$ that may be greater than radius $R_1$. The first mounting portion 64A may rotate and may not move substantially in X, Y, or Z-directions while the second mounting portion 64B and/or the third mounting portion 64C move within and/or along the second aperture 54B and/or the third aperture 54C, respectively. In the second position (e.g., with the pinion 80 in complete engagement with the sector 90), the torque prevailing configuration of the first mounting portion 64A, the first fastener 120A/122A, and the side member 52 may limit movement of the first mounting portion 64A while the second mounting portion 64B and/or the third mounting portion 64C are connected to the side member 52.

With embodiments, connecting the first mounting portion 64A, the side member 52, and the first fastener 120A/122A together may involve about 10 Nm of running torque. A reactionary torque may, for example, be about 1.2 Nm to about 8.0 Nm (e.g., about 4.6 Nm), and a reactionary force applied to the pinion 80 and/or the sector 90 may, for example, be about 180 N. If a thread forming/cutting configuration is used, a reactionary torque may, for example, be about 13 Nm to about 20 Nm (e.g., about 16.5 Nm), and a reactionary force applied to the pinion 80 and/or the sector 90 may, for example, be about 643 N. When the first mounting portion 64A is fully connected to the side member 52, the first fastener 120A/122A and/or the first mounting portion 64A may include a final torque of at least 30 Nm. The first fastener 120A/122A and/or the first mounting portion 64A may resist rotation unless subjected to a torque greater than about 30 Nm.

In embodiments, the first aperture 54A, the second aperture 54B, and/or the third aperture 54C may be offset from each other, such as in an X-direction and/or in a Z-direction. For example and without limitation, the first aperture 54A may be disposed at a first height (e.g., relative to the Z-direction), the second aperture 54B may be disposed at a second height, the third aperture 54C may be disposed at a third height, the first height may be greater than the third height, and/or the third height may be greater than the second height. In some configurations, two or more of the apertures 54A, 54B, 54C may be disposed at a substantially common height.

In embodiments, a method of assembling a seat assembly 20 may include providing a seat adjuster 30 and/or a seat 40. The seat assembly 20 may include a side member 52, a seat back 42, and/or a seat base 44. The seat base 44 and/or seat back 42 may include a seat cushion 46. The seat adjuster 30 may include a motor assembly 60 that may include a motor 62, a first mounting portion 64A, a second mounting portion 64B, and/or a third mounting portion 64C. The seat adjuster 30 may include a pinion 80, a sector 90, a first fastener 120A/122A, a second fastener 120B/122B, and/or a third fastener 120C/122C. The method may include connecting the first fastener 120A to the side member 52 and the first mounting portion 64A; connecting the second fastener 120B to the side member 52 and the second mounting portion 64B; and/or connecting the third fastener 120C to the side member 52 and the third mounting portion 64C. Connecting the first fastener 120A to the first mounting portion 64A may include rotating the pinion 80 into complete engagement with the sector 90 (e.g., substantially without play).

With embodiments, initially, the first mounting portion 64A, the second mounting portion 64B, and/or the third mounting portion 64C may be partially connected to the side member 52. The first mounting portion 64A may be connected completely (e.g., fixed) to the side member 52 before the second mounting portion 64B and/or the third mounting portion 64C may be connected completely to the side member 52. As the first mounting portion 64A is fully connected to the side member 52 (e.g., the first fastener 120A/122A may be fully tightened/torqued with the side member 52 and/or the first mounting portion 64A), the pinion 80 may move into complete (e.g., full) engagement with the sector 90. The pinion 80, the second mounting portion 64B, and/or the third mounting portion 64C may move along respective arcs as the first mounting portion 64A is fully connected to the side member 52. The second mounting portion 64B and/or the third mounting portion 64C may be fully connected to the side member 52 after the first mounting portion 64A is fully connected to the side member 52. Fully connecting the first mounting portion 64A before the second mounting portion 64B and/or third mounting portion 64C may allow the motor mount 64 to rotate during tightening of the first mounting portion 64A. As the motor mount 64 (e.g., the mounting portions 64A, 64B, 64C) rotates, the pinion 80 may move between partial/no connection with the sector 90 and complete connection with the sector 90.

In embodiments, once connection of the first mounting portion 64A, the second mounting portion 64B, and/or the third mounting portion 64C with the side member 52 is complete, the motor 62 may be operated to rotate the pinion 80, which may engage the sector 90 substantially without play to cause rotation and/or tilting of the seat 40 (e.g., the seat base 44 and/or the seat cushion 46).

With embodiments, the second mounting portion 64B and the second fastener 120B/122B may be connected via a torque prevailing connection, and/or the third mounting portion 64C and the third fastener 120C/122C may be connected via a torque prevailing connection.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

What is claimed is:

1. A method of assembling a seat adjuster, the method comprising;
   providing a first fastener, a second fastener, a third fastener, a motor, a pinion, a sector, and a side member, the motor including a first mounting portion, a second mounting portion, and a third mounting portion;
   connecting the first fastener to the side member and the first mounting portion;
   connecting the second fastener to the side member and the second mounting portion; and
   connecting the third fastener to the side member and the third mounting portion;
   wherein the first fastener is configured for a torque-prevailing connection with the first mounting portion of the motor; a first rotational axis is aligned with the pinion; the sector rotates about a second rotational axis; a third rotational axis is aligned with the first mounting portion; and connecting the first fastener to the side member includes (i) rotating the pinion about the third rotational axis into complete engagement with the sector and (ii) retaining, via the first fastener, the pinion in complete engagement with the sector.

2. The method of claim 1, wherein the side member includes a first aperture, a second aperture, and a third aperture; the first aperture is configured for connection with the first mounting portion and the first fastener substantially without play; and the second aperture and the third aperture include curved configurations corresponding to rotational movement of the pinion about the third rotational axis.

3. The method of claim 1, wherein connecting the first fastener to the side member involves a running torque of about 10 Nm.

4. The method of claim 3, wherein connecting the first fastener to the side member results in a final torque of about 30 Nm.

5. The method of claim 1, wherein connecting the second fastener and the third fastener with the side member is completed while the pinion is retained in complete engagement with the sector via the first fastener.

6. The method of claim 1, wherein the first fastener includes at least one of external threads and internal threads.

7. The method of claim 1, including operating the motor to rotate the pinion and the sector to cause tilting of a seat portion, substantially without play between the pinion and the sector.

\* \* \* \* \*